US010575013B2

United States Patent
Liu et al.

(10) Patent No.: US 10,575,013 B2
(45) Date of Patent: Feb. 25, 2020

(54) METHOD AND APPARATUS FOR DECODED PICTURE BUFFER MANAGEMENT IN VIDEO CODING SYSTEM USING INTRA BLOCK COPY

(71) Applicant: MEDIATEK INC., Hsinchu (TW)

(72) Inventors: Shan Liu, San Jose, CA (US); Xiaozhong Xu, State College, PA (US)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 15/766,921

(22) PCT Filed: Oct. 18, 2016

(86) PCT No.: PCT/CN2016/102322
§ 371 (c)(1),
(2) Date: Apr. 9, 2018

(87) PCT Pub. No.: WO2017/067429
PCT Pub. Date: Apr. 27, 2017

(65) Prior Publication Data
US 2018/0295382 A1 Oct. 11, 2018

Related U.S. Application Data

(60) Provisional application No. 62/298,518, filed on Feb. 23, 2016, provisional application No. 62/243,208, filed on Oct. 19, 2015.

(51) Int. Cl.
*H04N 19/593* (2014.01)
*H04N 19/105* (2014.01)
(Continued)

(52) U.S. Cl.
CPC ......... *H04N 19/593* (2014.11); *H04N 19/105* (2014.11); *H04N 19/159* (2014.11);
(Continued)

(58) Field of Classification Search
CPC .. H04N 19/593; H04N 19/105; H04N 19/107; H04N 19/159; H04N 19/172;
(Continued)

(56) References Cited

U.S. PATENT DOCUMENTS 5,301,192 A * 4/1994 Henrion ............. H04L 12/5601
370/412
2014/0016711 A1* 1/2014 Rodriguez ............. H04N 19/42
375/240.26
(Continued)

FOREIGN PATENT DOCUMENTS

CN 103430539 A 12/2013

OTHER PUBLICATIONS

International Search Report dated Jan. 22, 2017, issued in application No. PCT/CN2016/102322.
(Continued)

*Primary Examiner* — Kate H Luo
(74) *Attorney, Agent, or Firm* — Oblon, McClelland, Maier & Neustadt, L.L.P.

(57) ABSTRACT

Method and apparatus of managing a DPB (decoded picture buffer) for a video coding system are disclosed. Whether the IntraBC mode is used for a current picture is determined and a maximum allowed number of decoded pictures in the DPB is allocated based on whether the IntraBC mode is used for the current picture. The current picture is then encoded or decoded using decoded pictures stored in the DPB as reference data. In another method, a maximum number of reordered pictures in the DPB is determined. If certain conditions are true, one or more decoded pictures stored in the DPB will be emptied until none of the conditions is true. One condition corresponds to a number of decoded pictures in the DPB marked as "needed for output" being greater than the maximum number of reordered picture modified accord-
(Continued)

ing to whether the IntraBC mode is used for the current picture.

8 Claims, 5 Drawing Sheets

(51) Int. Cl.
H04N 19/159 (2014.01)
H04N 19/172 (2014.01)
H04N 19/423 (2014.01)
H04N 19/70 (2014.01)

(52) U.S. Cl.
CPC ......... *H04N 19/172* (2014.11); *H04N 19/423* (2014.11); *H04N 19/70* (2014.11)

(58) Field of Classification Search
CPC ...... H04N 19/423; H04N 19/44; H04N 19/70; B63B 39/03; F03B 13/22; F05B 2240/931; Y02E 10/38
USPC .................................................. 375/240.12
See application file for complete search history.

(56) References Cited

U.S. PATENT DOCUMENTS

| | | | | | |
|---|---|---|---|---|---|
| 2014/0301465 | A1* | 10/2014 | Kwon | .................. | H04N 19/503 375/240.16 |
| 2014/0376634 | A1* | 12/2014 | Guo | ...................... | H04N 19/52 375/240.16 |
| 2015/0016545 | A1* | 1/2015 | Ramasubramonian | ..................... | H04N 19/29 375/240.25 |
| 2015/0063440 | A1* | 3/2015 | Pang | .................... | H04N 19/174 375/240.02 |
| 2015/0139296 | A1* | 5/2015 | Yu | ........................ | H04N 19/103 375/240.02 |
| 2015/0264348 | A1* | 9/2015 | Zou | ........................ | H04N 19/70 375/240.02 |
| 2015/0264372 | A1* | 9/2015 | Kolesnikov | ............ | H04N 19/52 375/240.16 |
| 2015/0264386 | A1* | 9/2015 | Pang | .................... | H04N 19/513 375/240.16 |
| 2015/0271515 | A1* | 9/2015 | Pang | .................... | H04N 19/70 375/240.16 |
| 2015/0296213 | A1* | 10/2015 | Hellman | ................ | H04N 19/44 375/240.01 |
| 2016/0100163 | A1* | 4/2016 | Rapaka | ................ | H04N 19/117 375/240.16 |
| 2016/0227244 | A1* | 8/2016 | Rosewarne | .......... | H04N 19/105 |
| 2016/0241858 | A1* | 8/2016 | Li | ........................ | H04N 19/159 |
| 2017/0118484 | A1* | 4/2017 | Maeda | .................. | H04N 19/52 |
| 2017/0280159 | A1* | 9/2017 | Xu | ........................ | H04N 19/52 |

OTHER PUBLICATIONS

Zhang, X., et al.; "Block vector prediction for intra block copy;" Joint Collaborative Team on Video Coding (JCT-VC) of ITU-T SG 16 WP 3 and ISO/IEC JTC 1/SC 29/WG 11; Mar.-Apr. 2014; pp. 1-5.

* cited by examiner

METHOD AND APPARATUS FOR DECODED PICTURE BUFFER MANAGEMENT IN VIDEO CODING SYSTEM USING INTRA BLOCK COPY

CROSS REFERENCE TO RELATED APPLICATIONS

The present invention claims priority to U.S. Provisional Patent Application Ser. No. 62/243,208, filed on Oct. 19, 2015 and U.S. Provisional Patent Application Ser. No. 62/298,518, filed on Feb. 23, 2016. The U.S. Provisional Patent Applications are hereby incorporated by reference in their entireties.

TECHNICAL FIELD

The present invention relates to decoded picture buffer management for a video coding system. In particular, the present invention relates to decoded picture buffer management issue when the Intra Block Copy (IntraBC) mode is used, where two versions of a current decoded picture may have to be stored.

BACKGROUND

High Efficiency Video Coding (HEVC) is a new coding standard that has been developed in recent years. In the High Efficiency Video Coding (HEVC) system, the fixed-size macroblock of H.264/AVC is replaced by a flexible block, named coding unit (CU). Pixels in the CU share the same coding parameters to improve coding efficiency. A CU may begin with a largest CU (LCU), which is also referred as coded tree unit (CTU) in HEVC. In addition to the concept of coding unit, the concept of prediction unit (PU) is also introduced in HEVC. Once the splitting of CU hierarchical tree is done, each leaf CU is further split into one or more prediction units (PUs) according to prediction type and PU partition.

Along with the High Efficiency Video Coding (HEVC) standard development, the development of extensions of HEVC has also started. The HEVC extensions include range extensions (RExt) which target at non-4:2:0 colour formats, such as 4:2:2 and 4:4:4, and higher bit-depths video such as 12, 14 and 16 bits per sample. One of the likely applications is screen content coding (SCC) and various coding tools have been developed and demonstrate significant gains in coding efficiency. Among them, the palette coding (a.k.a. major colour based coding) techniques represent block of pixels using indices to the palette (major colours), and encode the palette and the indices by exploiting spatial redundancy.

Decoded Picture Buffer Consideration in Current SCC Draft Standard (SCM)

In HEVC, all the reference pictures are stored in a buffer referred as decoded picture buffer (DPB). This is performed each time when decoding a picture and the current decoded picture after the loop filtering operation is put into DPB (referred as filtered version of current decoded picture). For IntraBC mode (Intra-block copy mode), its reference picture is the current decoded picture prior to the loop filter (referred as unfiltered version of current decoded picture), which is an extra picture compared to HEVC version 1. In JCTVC-U0181 (X. Xu, et al., *On storage of filtered and unfiltered current decoded pictures,* Joint Collaborative Team on Video Coding (JCT-VC) of ITU-T SG 16 WP 3 and ISO/IEC JTC 1/SC 29/WG 11, 21st Meeting: Warsaw, PL, 19-26 Jun. 2015, Document: JCTVC-U0181), both the filtered and unfiltered versions of current decoded picture are placed into DPB for picture buffer management. The unfiltered version of current picture will be discarded after the completion of decoding current picture and the storage buffer for this picture will be released.

In JCTVC-U0181, the case that the two versions of current decoded picture are identical is considered. This happens when no loop filters (deblocking or SAO) are used for the current picture. In the current HEVC SCC working draft, a variable referred as TwoVersionsOfCurrDecPicFlag is used to identify whether the current picture is used as a reference picture and there are two different versions of current picture due to the use of loop filters in the picture.

In SPS, a syntax element is used to specify the maximum required DPB size for the current CVS (coded video stream). Another syntax element is used to specify the maximally allowed number of pictures that are coded ahead one picture but output after such a picture.

Syntax element sps_max_dec_pic_buffering_minus1[i] plus 1 specifies the maximum required size of the decoded picture buffer for the CVS in units of picture storage buffers when HighestTid is equal to i. The variable HighestTid identifies the highest temporal sub-layer to be decoded. The value of sps_max_dec_pic_buffering_minus1[i] shall be in the range of 0 to MaxDpbSize−1, inclusive, where MaxDpbSize is as specified in clause A.4 of JCTVC-U1005 (R. Joshi, et al, "*HEVC Screen Content Coding Draft Text 4*", JCTVC-U1005, Warsaw, PL, June 2015). When i is greater than 0, sps_max_dec_pic_buffering_minus1[i] shall be greater than or equal to sps_max_dec_pic_buffering_minus1[i−1]. The value of sps_max_dec_pic_buffering_minus1[i] shall be less than or equal to vps_max_dec_pic_buffering_minus1[i] for each value of i. When sps_max_dec_pic_buffering_minus1[i] is not present for i in the range of 0 to sps_max_sub_layers_minus1−1, inclusive, due to sps_sub_layer_ordering_info_present_flag being equal to 0, it is inferred to be equal to sps_max_dec_pic_buffering_minus1[sps_max_sub_layers_minus1].

Syntax element sps_max_num_reorder_pics[i] indicates the maximum allowed number of pictures with PicOutputFlag equal to 1 that can precede any picture with PicOutputFlag equal to 1 in the CVS in decoding order and follow that picture with PicOutputFlag equal to 1 in output order when HighestTid is equal to i. The value of sps_max_num_reorder_pics[i] shall be in the range of 0 to sps_max_dec_pic_buffering_minus1[i], inclusive. When i is greater than 0, sps_max_num_reorder_pics[i] shall be greater than or equal to sps_max_num_reorder_pics[i−1]. The value of sps_max_num_reorder_pics[i] shall be less than or equal to vps_max_num_reorder_pics[i] for each value of i. When sps_max_num_reorder_pics[i] is not present for i in the range of 0 to sps_max_sub_layers_minus1−1, inclusive, due to sps_sub_layer_ordering_info_present_flag being equal to 0, it is inferred to be equal to sps_max_num_reorder_pics[sps_max_sub_layers_minus1].

In the above example based on HEVC, sps_max_dec_pic_buffering_minus1[i] and sps_max_num_reorder_pics[i] are specified for each sub-layer i in a system arranged in multiple sub-layers. Nevertheless, the system may also have only one layer. The following sections from JCTVC-U1005 specify how pictures stored in DPB are removed from DPB.

C 5.2.2 Output and Removal of Pictures From the DPB

The output and removal of pictures from the DPB before the decoding of the current picture (but after parsing the slice header of the first slice of the current picture) happens instantaneously when the first decoding unit of the access unit containing the current picture is removed from the CPB (Coded Picture Buffer) and proceeds as follows:

The decoding process for RPS (Reference Picture Set) as specified in clause 8.3.2 is invoked.

If the current picture is an TRAP (Intra Random Access Point) picture with NoRaslOutputFlag equal to 1 that is not picture 0, the following ordered steps are applied:
1. The variable NoOutputOfPriorPicsFlag is derived for the decoder under test as follows:

If the current picture is a CRA (Clean Random Access) picture, NoOutputOfPriorPicsFlag is set equal to 1 (regardless of the value of no_output_of_prior_pics_flag).

Otherwise, if the value of pic_width_in_luma_samples, pic_height_in_luma_samples, chroma_format_idc, separate_colour_plane_flag, bit_depth_luma_minus8, bit_depth_chroma_minus8, or sps_max_ dec_pic_buffering_minus1[HighestTid] derived from the active SPS is different from the value of pic_width_in_luma_samples, pic_height_in_luma_samples, chroma_format_idc, separate_colour_plane_flag, bit_depth_luma_minus8, bit_ depth_chroma_minus8, or sps_max_dec_pic_buffering_minus1[HighestTid], respectively, derived from the SPS active for the preceding picture, NoOutputOfPriorPicsFlag may (but should not) be set to 1 by the decoder under test, regardless of the value of no_output_of_prior_pics_flag.

NOTE—Although setting NoOutputOfPriorPicsFlag equal to no_output_of_prior_pics_flag is preferred under these conditions, the decoder under test is allowed to set NoOutputOfPriorPicsFlag to 1 in this case.

Otherwise, NoOutputOfPriorPicsFlag is set equal to no_output_of_prior_pics_flag.

2. The value of NoOutputOfPriorPicsFlag derived for the decoder under test is applied for the HRD as follows:

If NoOutputOfPriorPicsFlag is equal to 1, all picture storage buffers in the DPB are emptied without output of the pictures they contain, and the DPB fullness is set equal to 0.

Otherwise (NoOutputOfPriorPicsFlag is equal to 0), all picture storage buffers containing a picture that is marked as "not needed for output" and "unused for reference" are emptied (without output), and all non-empty picture storage buffers in the DPB are emptied by repeatedly invoking the "bumping" process specified in clause C.5.2.4, and the DPB fullness is set equal to 0.

Otherwise (the current picture is not an IRAP picture with NoRaslOutputFlag equal to 1), all picture storage buffers containing a picture which are marked as "not needed for output" and "unused for reference" are emptied (without output). For each picture storage buffer that is emptied, the DPB fullness is decremented by one. When one or more of the following conditions are true, the "bumping" process specified in clause C.5.2.4 is invoked repeatedly while further decrementing the DPB fullness by one for each additional picture storage buffer that is emptied, until none of the following conditions are true:

The number of pictures in the DPB that are marked as "needed for output" is greater than sps_max_num_reorder_pics[HighestTid].

sps_max_latency_increase_plus1[HighestTid] is not equal to 0 and there is at least one picture in the DPB that is marked as "needed for output" for which the associated variable PicLatencyCount is greater than or equal to SpsMaxLatencyPictures[HighestTid].

The number of pictures in the DPB is greater than or equal to sps_max_dec_pic_buffering_minus1[HighestTid]+1.

C 5.2.3 Additional Bumping

The processes specified in this clause happen instantaneously when the last decoding unit of access unit n containing the current picture is removed from the CPB.

When the current picture has PicOutputFlag equal to 1, for each picture in the DPB that is marked as "needed for output" and follows the current picture in output order, the associated variable PicLatencyCount is set equal to PicLatencyCount+1.

The following applies:

If the current decoded picture has PicOutputFlag equal to 1, it is marked as "needed for output" and its associated variable PicLatencyCount is set equal to 0.

Otherwise (the current decoded picture has PicOutputFlag equal to 0), it is marked as "not needed for output".

When one or more of the following conditions are true, the "bumping" process specified in clause C.5.2.4 is invoked repeatedly until none of the following conditions are true:

The number of pictures in the DPB that are marked as "needed for output" is greater than sps_max_num_reorder_pics[HighestTid].

sps_max_latency_increase_plus1[HighestTid] is not equal to 0 and there is at least one picture in the DPB that is marked as "needed for output" for which the associated variable PicLatencyCount that is greater than or equal to SpsMaxLatencyPictures[HighestTid].

C 5.2.4 "Bumping" Process

The "bumping" process consists of the following ordered steps:

1. The picture that is first for output is selected as the one having the smallest value of PicOrderCntVal of all pictures in the DPB marked as "needed for output".
2. The picture is cropped, using the conformance cropping window specified in the active SPS for the picture, the cropped picture is output, and the picture is marked as "not needed for output".
3. When the picture storage buffer that included the picture that was cropped and output contains a picture marked as "unused for reference", the picture storage buffer is emptied.

NOTE—For any two pictures picA and picB that belong to the same CVS and are output by the "bumping process", when picA is output earlier than picB, the value of PicOrderCntVal of picA is less than the value of PicOrderCntVal of picB.

8.1.3 Decoding Process for a Coded Picture With nuh_layer_id Equal to 0

The decoding processes specified in this clause apply to each coded picture with nuh_layer_id equal to 0, referred to as the current picture and denoted by the variable CurrPic, in BitstreamToDecode.

Depending on the value of chroma_format_idc, the number of sample arrays of the current picture is as follows:

If chroma_format_idc is equal to 0, the current picture consists of 1 sample array $S_L$.

Otherwise (chroma_format_idc is not equal to 0), the current picture consists of 3 sample arrays $S_L$, $S_{Cb}$, $S_{Cr}$.

The decoding process for the current picture takes as inputs the syntax elements and upper-case variables from clause 7. When interpreting the semantics of each syntax element in each NAL unit, the term "the bitstream" (or part thereof, e.g., a CVS of the bitstream) refers to BitstreamToDecode (or part thereof).

When the current picture is a BLA picture that has nal_unit_type equal to BLA_W_LP or is a CRA picture, the following applies:
- If some external means not specified in this Specification is available to set the variable UseAltCpbParamsFlag to a value, UseAltCpbParamsFlag is set equal to the value provided by the external means.
- Otherwise, the value of UseAltCpbParamsFlag is set equal to 0.

When the current picture is an IRAP picture, the following applies:
- If the current picture is an IDR picture, a BLA picture, the first picture in the bitstream in decoding order, or the first picture that follows an end of sequence NAL unit in decoding order, the variable NoRaslOutputFlag is set equal to 1.
- Otherwise, if some external means not specified in this Specification is available to set the variable HandleCraAsBlaFlag to a value for the current picture, the variable HandleCraAsBlaFlag is set equal to the value provided by the external means and the variable NoRaslOutputFlag is set equal to HandleCraAsBlaFlag.
- Otherwise, the variable HandleCraAsBlaFlag is set equal to 0 and the variable NoRaslOutputFlag is set equal to 0.

Depending on the value of separate_colour_plane_flag, the decoding process is structured as follows:
- If separate_colour_plane_flag is equal to 0, the decoding process is invoked a single time with the current picture being the output.
- Otherwise (separate_colour_plane_flag is equal to 1), the decoding process is invoked three times. Inputs to the decoding process are all NAL units of the coded picture with identical value of colour_plane_id. The decoding process of NAL units with a particular value of colour_plane_id is specified as if only a CVS with monochrome colour format with that particular value of colour_plane_id would be present in the bitstream. The output of each of the three decoding processes is assigned to one of the 3 sample arrays of the current picture, with the NAL units with colour_plane_id equal to 0, 1, and 2 being assigned to $S_L$, $S_{Cb}$, and $S_{Cr}$, respectively.
  NOTE 1—The variable ChromaArrayType is derived as equal to 0 when separate_colour_plane_flag is equal to 1 and chroma_format_idc is equal to 3. In the decoding process, the value of this variable is evaluated resulting in operations identical to that of monochrome pictures (when chroma_format_idc is equal to 0).

The decoding process operates as follows for the current picture CurrPic:
1. The decoding of NAL units is specified in clause 8.2.
2. The processes in clause 8.3 specify the following decoding processes using syntax elements in the slice segment layer and above:

Variables and functions relating to picture order count are derived as specified in clause 8.3.1. This needs to be invoked only for the first slice segment of a picture.

The decoding process for RPS in clause 8.3.2 is invoked, wherein reference pictures may be marked as "unused for reference" or "used for long-term reference". This needs to be invoked only for the first slice segment of a picture.

A picture storage buffer in the DPB is allocated for storage of the decoded sample values of the current picture after the invocation of the in-loop filter process as specified in clause 8.7. When TwoVersionsOfCurrDecPicFlag is equal to 0 and pps_curr_pic_as_ref_enabled_flag is equal to 1, this picture storage buffer is marked as "used for long-term reference". When TwoVersionsOfCurrDecPicFlag is equal to 1, another picture storage buffer in the DPB is allocated for storage of the decoded sample values of the current picture immediately before the invocation of the in-loop filter process as specified in clause 8.7, and is marked as "used for long-term reference". This needs to be invoked only for the first slice segment of a picture.

When the current picture is a BLA picture or is a CRA picture with NoRaslOutputFlag equal to 1, the decoding process for generating unavailable reference pictures specified in clause 8.3.3 is invoked, which needs to be invoked only for the first slice segment of a picture.

3. The processes in clauses 8.4, 8.5, 8.6 and 8.7 specify decoding processes using syntax elements in all syntax structure layers. It is a requirement of bitstream conformance that the coded slices of the picture shall contain slice segment data for every coding tree unit of the picture, such that the division of the picture into slices, the division of the slices into slice segments, and the division of the slice segments into coding tree units each forms a partitioning of the picture.

4. After all slices of the current picture have been decoded, the current decoded picture after the invocation of the in-loop filter process as specified in clause 8.7, is marked as "used for short-term reference". When TwoVersionsOfCurrDecPicFlag is equal to 1, the current decoded picture before the invocation of the in-loop filter process as specified in clause 8.7, is marked as "unused for reference".

8.3.4 Decoding Process for Reference Picture Lists Construction

This process is invoked at the beginning of the decoding process for each P or B slice. The variables CurrPicInList0Flag and CurrPicInList1Flag are both set equal to 0.

Reference pictures are addressed through reference indices as specified in clause 8.5.3.3.2. A reference index is an index into a reference picture list. When decoding a P slice, there is a single reference picture list RefPicList0. When decoding a B slice, there is a second independent reference picture list RefPicList1 in addition to RefPicList0.

At the beginning of the decoding process for each slice, the reference picture lists RefPicList0 and, for B slices, RefPicList1 are derived as follows:

When TwoVersionsOfCurrDecPicFlag is equal to 1, let the variable currPic point to the current decoded picture before the invocation of the in-loop filter process as specified in clause 8.7; otherwise (TwoVersionsOfCurrDecPicFlag is equal to 0), let the variable currPic point to the current decoded picture after the invocation of the in-loop filter process as specified in clause 8.7.

In JCTVC-U1005, the maximum DPB size is described as follows. When the specified level is not level 8.5 defined in JCTVC-U1005, the value of sps_max_dec_pic_buffering_minus1[HighestTid]+1 shall be less than or equal to MaxDpbSize, which is derived as follows:

if(PicSizeInSamplesY<=(MaxLumaPs>>2))
      MaxDpbSize=Min(4*maxDpbPicBuf, 16)
    else if(PicSizeInSamplesY<=(MaxLumaPs>>1))
      MaxDpbSize=Min(2*maxDpbPicBuf, 16)
    else if(PicSizeInSamplesY<=((3*MaxLumaPs)>>2))
      MaxDpbSize=Min((4*maxDpbPicBuf)/3, 16)
    else
      MaxDpbSize=maxDpbPicBuf.

In the above derivation, MaxLumaPs is specified in Table A.6 of JCTVC-U1005, and maxDpbPicBuf is equal to 6 for all profiles. The value of sps_curr_pic_ref_enabled_flag is required to be equal to 0. The value of sps_curr_pic_ref_enabled_flag is 7 for all profiles where the value of sps_curr_pic_ref_enabled_flag is not required to be equal to 0.

Basically, the value MaxDpb Size is related to the resolution of video (indicated by MaxLumaPs). When the resolution is low, more pictures are allowed in DPB.

In JCTVC-U1005, the process of storing the current picture into the DPB and removing the current picture from the DPB are disclosed in Clauses C.3.4 and C.3.5 as follows.

C.3.4 Current Decoded Picture Marking and Storage

The current decoded picture after the invocation of the in-loop filter process as specified in clause 8.7 is stored in the DPB in an empty picture storage buffer, the DPB fullness is incremented by one. When TwoVersionsOfCurrDecPicFlag is equal to 0 and pps_curr_pic_ref_enabled_flag is equal to 1, this picture is marked as "used for long-term reference". After all the slices of the current picture have been decoded, this picture is marked as "used for short-term reference".

When TwoVersionsOfCurrDecPicFlag is equal to 1, the current decoded picture before the invocation of the in-loop filter process as specified in clause 8.7 is stored in the DPB in an empty picture storage buffer, the DPB fullness is incremented by one, and this picture is marked as "used for long-term reference".

Note that unless more memory than required by the level limit is available for storage of decoded pictures, decoders should start storing decoded parts of the current picture into the DPB when the first slice segment is decoded and continue storing more decoded samples as the decoding process proceeds.

C.3.5 Removal of Pictures From the DPB After Decoding of the Current Picture

When TwoVersionsOfCurrDecPicFlag is equal to 1, immediately after decoding of the current picture, at the CPB removal time of the last decoding unit of access unit n (containing the current picture), the current decoded picture before the invocation of the in-loop filter process as specified in clause 8.7 is removed from the DPB, and the DPB fullness is decremented by one.

With the changes in decoded picture buffer management when current picture is a reference picture, some constraints need to be imposed to ensure that the function of decoded picture buffer management works properly.

Figure 1A:
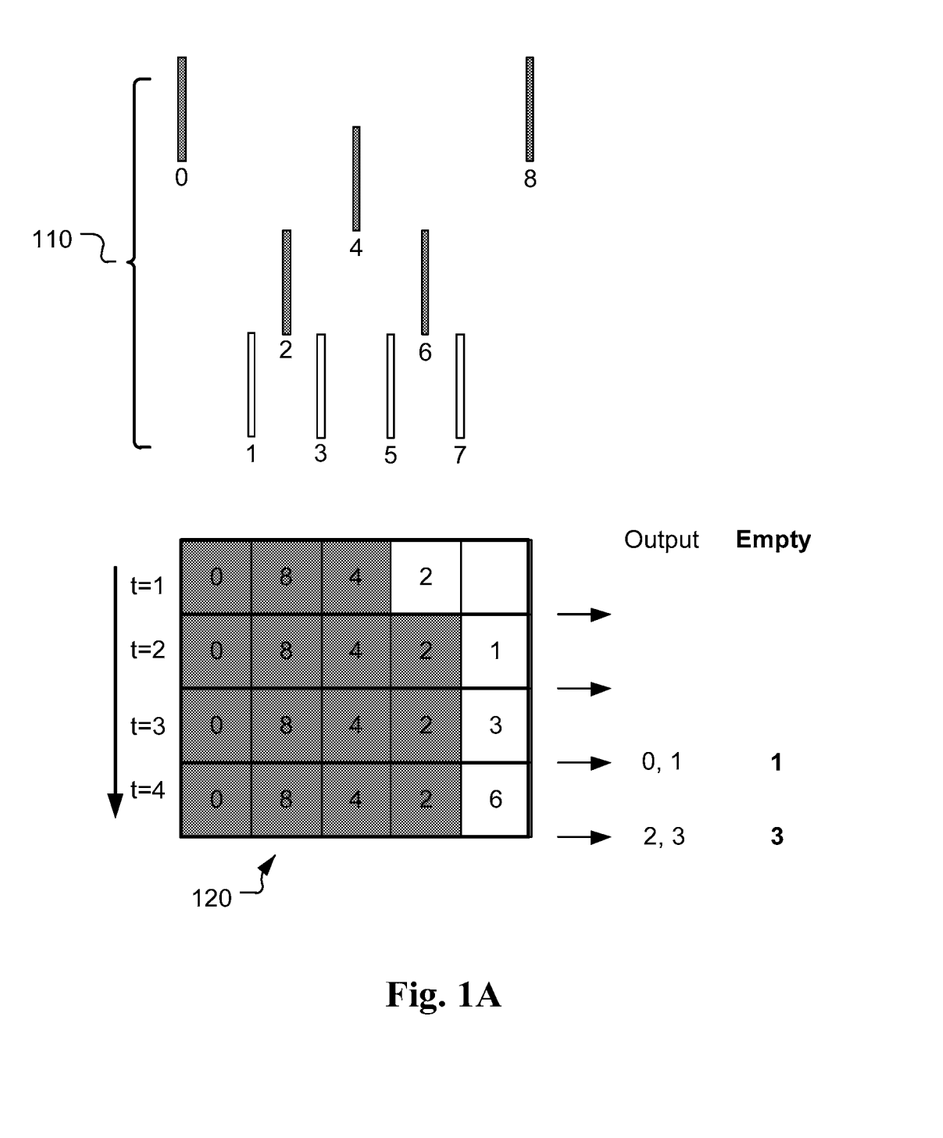
FIG. 1A illustrates an example of decoded picture buffer management process, wherein the maximum number of decoded picture buffer size is set to 5 and the maximum number of reordered pictures is 4.

FIG. 1A illustrates an example of decoded picture buffer management process for a coding system using temporal hierarchy 110. The maximum number of decoded picture buffer size is set to 5 and the maximum number of reordered pictures is 4. The DPB status 120 at different time instances are shown, where each filled box indicates an occupied decoded picture and each white box indicates an available picture buffer to contain current and future decoded picture. The pictures outputed and removed from the DPB are listed for different time instances.

Figure 1B:
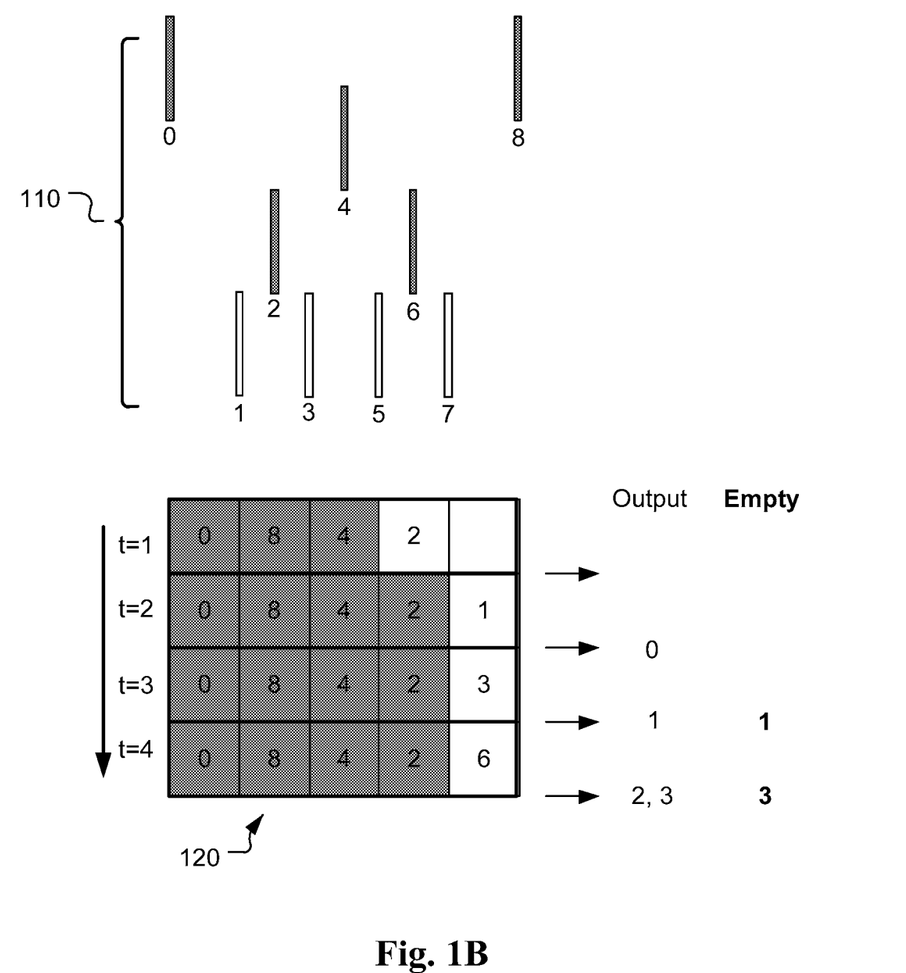
FIG. 1B illustrates an example of decoded picture buffer management process, wherein the maximum number of decoded picture buffer size is set to 5 and the maximum number of reordered pictures is 3.

FIG. 1B illustrates an example of decoded picture buffer management process, wherein the maximum number of decoded picture buffer size is set to 5 and the maximum reordered number of pictures is 3.

In this invention, several methods that are related to the Palette predictor initialization at PPS or SPS, and the DPB management when current picture is a reference picture are disclosed.

SUMMARY

A method and apparatus of managing a DPB (decoded picture buffer) for a video coding system using an IntraBC (Intra Block Copy) mode are disclosed. According to this method, whether the IntraBC mode is used for a current picture is determined and a maximum allowed number of decoded pictures in the DPB is allocated based on whether the IntraBC mode is used for the current picture. The current picture is then encoded or decoded using decoded pictures stored in the DPB as reference data. The total number of decoded pictures in the DPB, not counting the current picture, is equal to or less than the maximum allowed number of decoded pictures in the DPB.

Whether the IntraBC mode is used for the current picture can be indicated by a syntax flag or a variable, and the value of the syntax flag or a variable is related to whether two versions of decoded current picture need to be stored. For example, the value of the syntax flag or a variable is 1 if two versions of decoded current picture need to be stored and is 0 otherwise. The method may include a process to empty one or more decoded pictures stored in the DPB when certain conditions are true. The conditions may include one condition corresponding to the total number of decoded pictures in the DPB being greater than or equal to the value of maximum-buffer-size syntax modified by the value of the syntax flag or a variable. For example, the condition corresponds to the total number of decoded pictures in the DPB being greater than or equal to the value of maximum-buffer-size syntax reduced by the value of the syntax flag or a variable. In another example, the condition corresponds to the total number of decoded pictures in the DPB being greater than or equal to the value of maximum-buffer-size syntax reduced by the minimum of the value of the syntax flag or a variable and the value of maximum-buffer-size syntax.

Another method and apparatus of managing a DPB for a video coding system using an IntraBC mode are disclosed. This method will determine a maximum number of reordered pictures in the DPB. If certain conditions are true, one or more decoded pictures stored in the DPB will be emptied until none of the conditions is true. The conditions include a first condition corresponding to a number of decoded pictures in the DPB marked as "needed for output" being greater than the maximum number of reordered picture modified according to whether the IntraBC mode is used for the current picture. The current picture is then encoded or decoded using decoded pictures stored in the DPB as reference data.

A method and apparatus of managing a DPB for a video coding system allowing multiple colour formats are disclosed. This method determining a target total memory size for storing a target maximum number of decoded pictures in the DPB at a target resolution in a target colour format. Also, a scaling factor is determined for current pictures having the same target resolution, but in a second colour format different from the target colour format. A second maximum number of second decoded pictures is allocated in the DPB for the current pictures according to the target maximum number of decoded pictures scaled by the scaling factor. The scaling factor is smaller than 1 for at least one second colour format. The current picture is then encoded or decoded using decoded pictures stored in the DPB as reference data. For example, the target colour format corresponds to a 4:4:4 colour format. The scaling factor is set to ⅓, ½ and ⅔ for the second colour format corresponding to a 4:0:0, 4:2:0 and 4:2:2 colour formats respectively.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

As mentioned previously, when the IntraBC mode (Intra-block copy mode) is used, the current decoded picture prior to the loop filter can be used to provide reference data for IntraBC coded blocks, which may have impact on existing decoded reference picture buffer (DPB). The changes in decoded picture buffer management due to the use of the current picture as a reference picture may cause some DPB management issues. Accordingly, the present invention discloses various solutions for potential issues in DPB constraints when IntraBC mode is used.

I: DPB Constraints When Current Picture is a Reference Picture

As mentioned before, the syntax element sps_max_num_reorder_pics[i] shall be in the range of 0 to sps_max_dec_pic_buffering_minus1[i], inclusive. When sps_max_num_reorder_pics[i] is equal to sps_max_dec_pic_buffering_minus1[i], this means that it is allowed to use (DPB size−1) picture buffers in the DPB to store those decoded pictures that fit into the description in the definition of sps_max_num_reorder_pics[i]. For the conventional approach such as the JCTVC-U1005 draft standard, those pictures are assumed not currently decoded picture. However, for any particular current picture under coding/decoding using the IntraBC mode, two versions of the current decoded pictures need to be stored. If (DPB size−1) pictures are already occupied by those pictures, there is no space in the DPB to store another version (i.e., un-filtered version) of current decoded picture (i.e., the version prior to the invocation of loop filter process).

Before decoding current picture (but after parsing the slice header of first slice of the current picture), the existing decoded pictures in DPB need to be checked to determine if there is a need to remove one or more of them. If the number of pictures in the DPB that are marked as "needed for output" is greater than sps_max_num_reorder_pics[HighestTid], one or more of the existing pictures in the DPB need to be output and/or removed from DPB until the number of pictures in the DPB that are marked as "needed for output" is no longer greater than sps_max_num_reorder_pics[HighestTid]. In the case that sps_max_num_reorder_pics[HighestTid] is equal to sps_max_dec_pic_buffering_minus1[HighestTid], the empty picture buffer left in DPB, when the above picture removing process stops, can be just 1. The empty picture buffer can be used for storing current decoded picture. When IntraBC is used, there may be a case that the picture immediately prior to the invocation of in-loop filter process (i.e., unfiltered version) needs to be stored in addition to the current picture storage for the decoded picture after invocation of in loop filter process (i.e., filtered version). However, in this case there may be no empty space in DPB can be allocated.

Therefore, one additional existing decoded picture in the DPB needs to be removed to create an empty buffer for the storage of the current decoded picture immediately prior to the invocation of in loop filter process (unfiltered version). Accordingly, a method according to the present invention is disclosed to adjust the value of sps_max_num_reorder_pics[HighestTid] for this current picture according to the variable TwoVersionsOfCurrDecPicFlag. When this variable is equal to 1 (i.e., IntraBC being used and two versions of current picture existing due to the use of loop filter), picture removing process stops when the number of pictures in the DPB that are marked as "needed for output" is no longer greater than (sps_max_num_reorder_pics[HighestTid]−1). When TwoVersionsOfCurrDecPicFlag is 0, or sps_max_num_reorder_pics[HighestTid] is less than sps_max_dec_pic_buffering_minus1[HighestTid], there is no need for such adjustment.

Immediately after the decoding of current picture is finished, the current decoded picture after invocation of in-loop filter process (i.e., filtered version) may need to stay in the DPB for future output. In this case the above mentioned picture removed process may need to process again, because the number of pictures in the DPB that are marked as "needed for output" has changed.

In another embodiment, before decoding current picture (but after parsing the slice header of first slice of the current picture), the existing decoded pictures in DPB need to be checked to determine if there is a need to remove one or more of the decoded pictures. If the number of pictures in the DPB is greater than or equal to (sps_max_dec_pic_buffering_minus1[HighestTid]+1) (i.e., no buffer for current picture), one or more of the existing pictures in the DPB need to be removed from DPB until the number of pictures in the DPB is smaller than or equal to sps_max_dec_pic_buffering_minus1[HighestTid].

When the above picture removing process stops, the empty picture buffer left in DPB can be just 1, which can be used for storing current decoded picture. When IntraBC is used, there may be a case that the picture immediately prior to the invocation of in-loop filter process (i.e., unfiltered version) needs to be stored in addition to the current picture storage for the decoded picture after invocation of in loop filter process (i.e., filtered version). However, in this case there may be no empty space in DPB can be allocated. Therefore, one additional existing decoded picture in the DPB needs to be removed to create an empty buffer for the storage of the current decoded picture immediately prior to the invocation of in-loop filter process (unfiltered version). In one embodiment, the value of sps_max_dec_pic_buffering_minus1[HighestTid] is adjusted for this current picture with the variable TwoVersionsOfCurrDecPicFlag. When this variable is equal to 1 (i.e., IntraBC being used and versions of current picture existing due to the use of loop filter), picture removing process stops when the number of pictures in the DPB is smaller than or equal to (sps_max_dec_pic_buffering_minus1[HighestTid]−1). When TwoVersionsOfCurrDecPicFlag is 0, no need for such adjustment.

In the following embodiment, a variable AdditionalPictureBufferRemovalFlag is defined as: AdditionalPictureBufferRemovalFlag=(TwoVersionsOfCurrDecPicFlag && sps_max_num_reorder_pics[HighestTid]==sps_max_dec_pic_buffering_minus1[HighestTid])

Modified to C 5.2.2 Output and Removal of Pictures From the DPB

As an example according to an embodiment of this method, the Output and removal of pictures from the DPB as disclosed in subclause C.5.2.2 can be modified. The subclause is pretty much the same except for two of the three bullet items at the end of item 2, where additional texts are added as indicated in Italic style:

The number of pictures in the DPB that are marked as "needed for output" is greater than sps_max_num_reorder_pics[HighestTid]−AdditionalPictureBufferRemovalFlag.
. . .
The number of pictures in the DPB is greater than or equal to sps_max_dec_pic_buffering_minus1[HighestTid]+1−TwoVersionsOfCurrDecPicFlag.

In the above example, the maximum number of reordered picture (i.e., sps_max_num_reorder_pics[HighestTid] is reduced by the value of "AdditionalPictureBufferRemovalFlag". The maximum number of decoded picture (i.e., sps_max_dec_pic_buffering_minus1[HighestTid] is reduced by the value of "Two VersionsOfCurrDecPicFlag". While specific variable names or syntaxes are used in this disclosure as examples, these specific variable names or syntaxes shall not construed as limitations to the present invention. Furthermore, the syntax based HEVC SCC draft standard, JCTVC-U1005 is used to illustrate DPB management, and the present invention is not limited to the specific syntax of the HEVC SCC draft standard.

In another embodiment, C 5.2.2 can be modified as below, where only the parts modified are shown and the texts in Italic indicate insertion.

The number of pictures in the DPB that are marked as "needed for output" is greater than sps_max_num_reorder_pics[HighestTid]−(AdditionalPictureBufferRemovalFlag & sps_max_num_reorder_pics[HighestTid]).

The number of pictures in the DPB is greater than or equal to sps_max_dec_pic_buffering_minus1[HighestTid]+1−(TwoVersionsOfCurrDecPicFlag & sps_max_dec_pic_buffering_minus1[HighestTid]).

In another embodiment, C 5.2.2 can be modified as below, where only the parts modified are shown and the texts in Italic indicate insertion.

The number of pictures in the DPB that are marked as "needed for output" is greater than sps_max_num_reorder_pics[HighestTid]−min (AdditionalPictureBufferRemovalFlag, sps_max_num_reorder_pics [HighestTid]).

The number of pictures in the DPB is greater than or equal to sps_max_dec_pic_buffering_minus1[HighestTid]+1−min(TwoVersionsOfCurrDecPicFlag, sps_max_dec_pic_buffering_minus1[HighestTid]).

Modified to C 5.2.3 Additional Bumping

As an example according to an embodiment of this method, the Output and removal of pictures from the DPB as disclosed in subclause C.5.2.3 can be modified. The subclause is pretty much the same except for one of the two bullet items at the end of subclause C.5.2.3, where additional texts are added as shown in Italic style:

The number of pictures in the DPB that are marked as "needed for output" is greater than sps_max_num_reorder_pics[HighestTid]−AdditionalPictureBufferRemovalFlag.

sps_max_latency_increase_plus1[HighestTid] is not equal to 0 and . . . .

In another embodiment, C 5.2.3 can be modified as below, where only the parts modified are shown and the texts in Italic indicate insertion.

The number of pictures in the DPB that are marked as "needed for output" is greater than sps_max_num_reorder_pics[HighestTid]−(AdditionalPictureBufferRemovalFlag & sps_max_num_reorder_pics[HighestTid]).

In yet another embodiment, C 5.2.3 can be modified as below, where only the parts modified are shown and the texts in Italic indicate insertion.

The number of pictures in the DPB that are marked as "needed for output" is greater than sps_max_num_reorder_pics[HighestTid]−min (AdditionalPictureBufferRemovalFlag, sps max num reorder pics[HighestTid]).

In these embodiments, the changes indicated in C 5.2.2 Output and removal of pictures from the DPB and in C 5.2.3 Additional bumping are jointly applied. In another embodiment, each change may be separately applied. For example, the changes in C 5.2.2 can be applied while no change in C 5.2.3 is applied. In another example, the change made to sps_max_num_reorder_pics[HighestTid] in C 5.2.2 is not applied while the change made to sps_max_dec_pic_buffering_minus1[HighestTid]+1 is applied.

In yet another embodiment, in all the above embodiments, AdditionalPictureBufferRemovalFlag can be set to TwoVersionsOfCurrDecPicFlag.

In yet another embodiment, in all the above embodiments, TwoVersionsOfCurrDecPicFlag can be set to IntraBC enabling flag at SPS. In other words, when IntraBC is enabled at sequence level, TwoVersionsOfCurrDecPicFlag is equal to 1 for the whole sequence.

In another embodiment, when IBC is used, the range of the syntax element sps_max_num_reorder_pics[i] is restricted based on the value of the syntax element sps_curr_pic_ref_enabled_flag in order to ensure proper DPB operations. When the SPS level flag signals that IBC is used in current sequence, the value of sps_max_num_reorder_pics[i] is reduced by one. Note that this is true only when the corresponding syntax element sps_max_dec_pic_buffering_minus1[i] of the same layer is greater than 0.

In one embodiment, the proposed changes to the semantics of the syntax element sps_max_num_reorder_pics[i] are shown below, where the text in Italic style indicates insertion:

sps_max_num_reorder_pics[i] indicates the maximum allowed number of pictures with PicOutputFlag equal to 1 that can precede any picture with PicOutputFlag equal to 1 in the CVS in decoding order and follow that picture with PicOutputFlag equal to 1 in output order when HighestTid is equal to i. The value of sps_max_num_reorder_pics[i] shall be in the range of 0 to sps_max_dec_pic_buffering_minus1[i]–(sps_curr_pic_ref_enabled_flag & sps_max_dec_pic_buffering_minus1[i]), inclusive. When i is greater than 0, sps_max_num_reorder_pics[i] shall be greater than or equal to sps_max_num_reorder_pics[i−1]. The value of sps_max_num_reorder_pics[i] shall be less than or equal to vps_max_num_reorder_pics[i] for each value of i. When sps_max_num_reorder_pics[i] is not present for i in the range of 0 to sps_max_sub_layers_minus1−1, inclusive, due to sps_sub_layer_ordering_info_present_flag being equal to 0, it is inferred to be equal to sps_max_num_reorder_pics[sps_max_sub_layers_minus1].

In another embodiment, the proposed changes to the semantics of the syntax element sps_max_num_reorder_pics[i] are shown below, where the text in Italic style indicates insertion:

sps_max_num_reorder_pics[i] indicates the maximum allowed number of pictures with PicOutputFlag equal to 1 that can precede any picture with PicOutputFlag equal to 1 in the CVS in decoding order and follow that picture with PicOutputFlag equal to 1 in output order when HighestTid is equal to i. The value of sps_max_num_reorder_pics[i] shall be in the range of 0 to sps_max_dec_pic_buffering_minus1[i]–min(sps_curr_pic_ref_enabled_flag, sps_max_dec_pic_buffering_minus1[i]), inclusive. When i is greater than 0, sps_max_num_reorder_pics[i] shall be greater than or equal to sps_max_num_reorder_pics[i−1]. The value of sps_max_num_reorder_pics[i] shall be less than or equal to vps_max_num_reorder_pics[i] for each value of i. When sps_max_num_reorder_pics[i] is not present for i in the range of 0 to sps_max_sub_layers_minus1−1, inclusive, due to sps_sub_layer_ordering_info_present_flag being equal to 0, it is inferred to be equal to sps_max_num_reorder_pics[sps_max_sub_layers_minus1].

II. DPB Size for Different Colour Formats

Another aspect of the present invention addresses the issue associated with the DPB under different colour picture formats. Given a fixed size of total available memory, if a video codec is designed to support a certain number of reference pictures for a video with a target colour format (e.g. 4:4:4 format). When the actual format used requires lower chroma sample rate (e.g. 4:2:0 or monochrome), ideally the maximum number of picture buffer size assigned for contents with lower chroma sample rates can be larger than those contents with higher chroma sample rates. According to a method of the present invention, when the same amount of memory is used to store the decoded pictures, the maximum allowed number of DPB size for contents with lower chroma sample rate is adjusted (larger).

In one embodiment, the total memory assigned for storing monochrome pictures is the same as the total memory for 4:2:0 format contents with the same luma resolution. In this case, the ratio of memory between storing a 4:2:0 format picture and storing a monochrome picture is 6:4=3:2. Therefore the maximum DPB size defined for monochrome can be increased by a factor of 3:2. An example of this embodiment can be applied to HEVC. For example, the clause A.4.2 in Annex of JCTVC-U1005 can be modified to support the adjusted the maximum allowed number of DPB size shown as follows. The inserted texts are shown in Italic style.

A. Modified A.4.2 Profile-Specific Level Limits for the Video Profiles

Note that video profiles refer to those profiles that are not still picture profiles. The still picture profiles include the Main Still Picture profile, the Main 4:4:4 Still Picture profile, and the Main 4:4:4 16 Still Picture profile.

The following is specified for expressing the constraints in this annex:

Let the variable fR be set equal to 1÷300.

The variable HbrFactor is defined as follows:

If the bitstream or sub-layer representation is indicated to conform to the Main profile or the Main 10 profile, HbrFactor is set equal to 1.

Otherwise, if the bitstream or sub-layer representation is indicated to conform to the High Throughput 4:4:4, High Throughput 4:4:4 10, High Throughput 4:4:4 14, Screen-Extended High Throughput 4:4:4, Screen-Extended High Throughput 4:4:4 10, or Screen-Extended High Throughput 4:4:4 14 profile, HbrFactor is set equal to 6.

Otherwise, if the bitstream or sub-layer representation is indicated to conform to the High Throughput 4:4:4 16 Intra profile, HbrFactor is set equal to 24−(12*general_lower_bit_rate_constraint_flag) or 24−(12*sub_layer_lower_bit_rate_constraint_flag[i]).

Otherwise, HbrFactor is set equal to 2−general_lower_bit_rate_constraint_flag or 2−sub_layer_lower_bit_rate_constraint_flag[i].

The variable BrVclFactor, which represents the VCL bit rate scale factor, is set equal to CpbVclFactor*HbrFactor. The variable BrNalFactor, which represents the NAL bit rate scale factor, is set equal to CpbNalFactor*HbrFactor. The variable MinCr is set equal to MinCrBase*MinCrScaleFactor÷HbrFactor.

The variable SFactor is defined as follows:

If the bitstream or sub-layer representation is indicated to conform to the Screen-Extended Main 10 4:4:4 profile, and if chroma_format_idc is equal to 0, SFactor is set equal to (2··3)

Otherwise, SFactor is set equal to 1

When the specified level is not level 8.5 as defined in JCTVC-U1005, the value of (sps_max_dec_pic_buffering_minus1[HighestTid]+1) shall be less than or equal to MaxDpbSize, which is derived as follows:

```
if( PicSizeInSamplesY <= ( MaxLumaPs >> 2 ) )
    MaxDpbSize = Min( 4 * maxDpbPicBuf/SFactor, 16)
else if( PicSizeInSamplesY <= ( MaxLumaPs >> 1 ) )
    MaxDpbSize = Min( 2 * maxDpbPicBuf/SFactor, 16)
else if( PicSizeInSamplesY <= ( ( 3 * MaxLumaPs ) >> 2 ) )
    MaxDpbSize = Min( ( 4 * maxDpbPicBuf/SFactor) / 3, 16
    )
else
```

MaxDpbSize=maxDpbPicBuf/SFactor
where MaxLumaPs is specified in Table A.6, and maxDpbPicBuf is equal to 6 for all profiles where the value of sps_curr_pic_ref_enabled_flag is required to be equal to 0 and 7 for all profiles where the value of sps_curr_pic_ref_enabled_flag is not required to be equal to 0.

In the above example, a new variable SFactor is introduced and is used to adjust the maximum number of picture buffer size. Note that when the maxDpbPicBuf/SFactor results in a non-integer value, it can be clipped to the nearest integer value that is not larger than the original value. For example, MaxDpb Size=(Int) (maxDpbPicBuf/SFactor).

In another example, the total memory assigned for storing monochrome pictures is the same as the total memory for 4:4:4 format content with the same luma resolution. In this case, the ratio of memory between storing a 4:4:4 format picture and storing a monochrome picture is 3:1. Therefore the maximum DPB size defined for monochrome can be increased by a factor of 3. An example of this embodiment can be applied to HEVC. For example, the clause A.4.2 in Annex of JCTVC-U1005 can be modified to support the adjusted the maximum allowed number of DPB size shown as follows. The inserted texts are shown in Italic style. The modified A.4.2 is almost the same the previous modified A.4.2 except that the SFactor is set equal to (1·3).

B. Modified A.4.2 Profile-Specific Level Limits for the Video Profiles

The variable MinCr is set equal to MinCrBase*MinCrScaleFactor÷HbrFactor.

If the bitstream or sub-layer representation is indicated to conform to the Screen-Extended Main 10 4:4:4 profile, and if chroma_format_idc is equal to 0, SFactor is set equal to (1··3).

Otherwise, SFactor is set equal to 1.

In yet another method, the total memory assigned for storing 4:2:0 format pictures is the same as the total memory for 4:4:4 format content with the same luma resolution. In this case, the ratio of memory between storing a 4:4:4 format picture and storing a 4;2:0 format picture is 2:1. Similar as above mentioned embodiment, the SFactor is set to be (1··2).

In yet another method, the total memory assigned for storing 4:2:2 format pictures is the same as the total memory for 4:4:4 format content with the same luma resolution. In this case, the ratio of memory between storing a 4:4:4 format picture and storing a 4;2:2 format picture is 3:2. Similar as above mentioned embodiment, the SFactor is set to be (2··3).

III. DPB Management When Current Picture is Regarded as a Reference Picture

Another aspect of the present invention addresses the DPB management for the current picture being regarded as a reference picture. In one embodiment, a constraint is imposed such that when the maximum DPB size is 1, the creation and deletion of current decoded picture (before loop filtering) are not allowed since there is no space for storing this extra version of current picture. The case of maximum DPB size being 1 can be indicated by the SPS level flag sps_max_dec_pic_buffering_minus1[sps_max_sub_layers_minus1]+1, or sps_max_dec_pic_buffering_minus1[TemporalId]+1, or sps_max_dec_pic_buffering_minus1[HighestTid], or a flag that indicates the maximum allowed DPB size for the current sequence).

An example of this embodiment can be applied to HEVC. For example, the subclause 8.1.3 of JCTVC-U1005 can be modified to support the DPB management for the current picture being regarded as a reference picture. The inserted texts are shown in Italic style. In the modified subclause 8.1.3, only these parts different from the subclause 8.1.3 of JCTVC-U1005 are listed, where texts in Italic style indicate inserted texts.

Modified 8.1.3—Decoding Process for a Coded Picture with nuh_layer_id Equal to 0

2. The processes in clause 8.3 specify the following decoding processes using syntax elements in the slice segment layer and above:

. . .

. . .

. . . When TwoVersionsOfCurrDecPicFlag is equal to 1 and sps_max_dec_pic_buffering_minus1[HighestTid] is greater than 0, another picture storage buffer in the DPB is allocated for storage of the decoded sample values of the current picture immediately before the invocation of the in-loop filter process as specified in clause 8.7, and is marked as "used for long-term reference" . . . .

. . .

4. . . . When TwoVersionsOfCurrDecPicFlag is equal to 1 and sps_max_dec_pic_buffering_minus1[HighestTid] is greater than 0, the current decoded picture before the invocation of the in-loop filter process as specified in clause 8.7, is marked as "unused for reference".

An example of this embodiment can be applied to HEVC. For example, the subclause 8.3.4 of JCTVC-U1005 can be modified to support the DPB management for the current picture being regarded as a reference picture. The inserted texts are shown in Italic style. In the modified subclause 8.3.4, only these parts different from the subclause 8.3.4 of JCTVC-U1005 are listed, where texts in Italic style indicate inserted texts.

Modified 8.3.4—Decoding Process for Reference Picture Lists Construction

When TwoVersionsOfCurrDecPicFlag is equal to land sps_max_dec_pic_buffering_minus1[HighestTid] is greater than 0, let the variable currPic point to the current decoded picture before the invocation of the in-loop filter process as specified in clause 8.7; otherwise (TwoVersionsOfCurrDecPicFlag is equal to 0), let the variable currPic point to the current decoded picture after the invocation of the in-loop filter process as specified in clause 8.7.

An example of this embodiment can be applied to HEVC. For example, the subclauses C.3.4 and C.3.5 of JCTVC-U1005 can be modified to support the DPB management for the current picture being regarded as a reference picture. The inserted texts are shown in Italic style. In the modified subclauses C.3.4 and C.3.5, only these parts different from the subclauses C.3.4 and C.3.5 of JCTVC-U1005 are listed, where texts in Italic style indicate inserted texts.

Modified C.3.4—Current Decoded Picture Marking and Storage

When TwoVersionsOfCurrDecPicFlag is equal to 1 and sps_max_dec_pic_buffering_minus1[HighestTid] is greater than 0, the current decoded picture before the invocation of the in-loop filter process as specified in clause 8.7 is stored in the DPB in an empty picture storage buffer, the DPB fullness is incremented by one, and this picture is marked as "used for long-term reference".

Modified C.3.5—Removal of Pictures From the DPB After Decoding of the Current Picture When TwoVersionsOfCurrDecPicFlag is equal to land sps_max_dec_pic_buffering_minus1[HighestTid] is greater than 0, immediately after decoding of the current picture, at the CPB removal time of the last decoding unit of access unit n (containing the current picture), the current decoded picture before the invocation of the in-loop filter process as specified in clause 8.7 is removed from the DPB, and the DPB fullness is decremented by one.

Again, while specific variable names or syntaxes are used in this disclosure as examples, these specific variable names or syntaxes shall not construed as limitations to the present invention. Furthermore, the syntax based HEVC SCC draft standard is used to illustrate DPB management, and the present invention is not limited to the specific syntax of the HEVC SCC draft standard.

Figure 2:
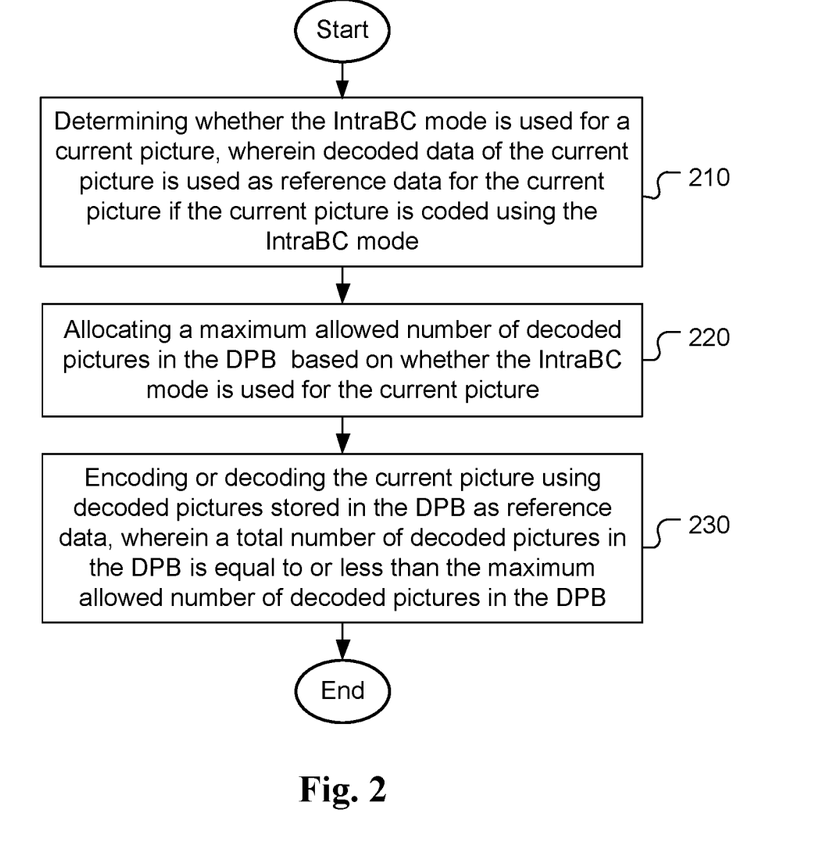
FIG. 2 illustrates a flowchart of an exemplary coding system using coding modes including IntraBC mode (Intra-block copy mode) and Inter prediction mode according to an embodiment of the present invention, where the maximum allowed number of decoded pictures is allocated in the DPB based on whether the IntraBC mode is used for the current picture.

FIG. 2 illustrates a flowchart of an exemplary coding system using coding modes including IntraBC mode (Intra-block copy mode) and Inter prediction mode according to an embodiment of the present invention, where the maximum allowed number of decoded pictures is allocated in the DPB based on whether the IntraBC mode is used for the current picture. The method determines whether the IntraBC mode is used for a current picture in step 210, where decoded data of the current picture is used as reference data for the current picture if the current picture is coded using the IntraBC mode. In the encoder side, the encoder usually selects a desired coding mode based on characteristics of the underlying video data or a certain criteria such as rate-distortion optimization (RDO), which is well known in the field. The coding mode selected usually is signalled explicitly in the bitstream or implicitly according to derivation method known to both the encoder and the decoder. At the decoder side, the decoder side, the coding mode can be parsed from the bitstream or derived implicitly. A maximum allowed number of decoded pictures is allocated in the DPB based on whether the IntraBC mode is used for the current picture in step 220. The current picture is encoded or decoded using decoded pictures stored in the DPB as reference data, wherein a total number of decoded pictures in the DPB is equal to or less than the maximum allowed number of decoded pictures in the DPB in step 230.

Figure 3:
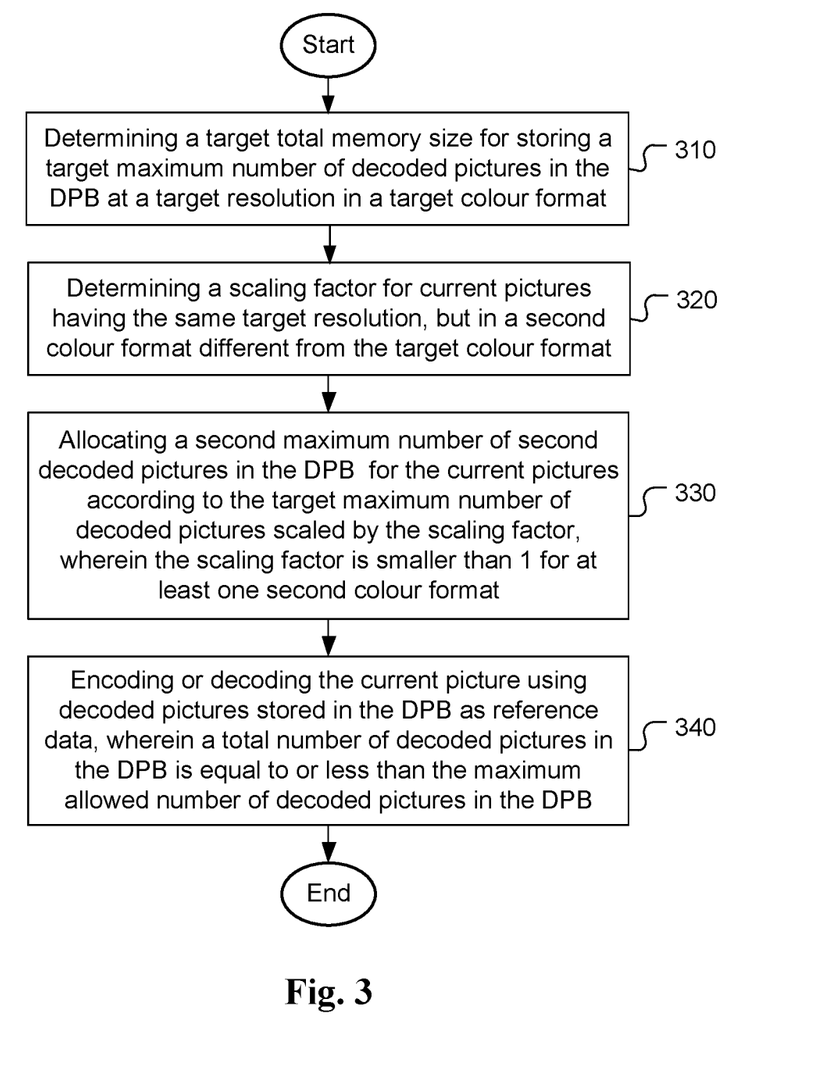
FIG. 3 illustrates a flowchart of an exemplary coding system allowing multiple colour formats, where the maximum allowed number of decoded pictures is allocated according to the colour format.

FIG. 3 illustrates a flowchart of an exemplary coding system allowing multiple colour formats, where the maximum allowed number of decoded pictures is allocated according to the colour format. The method determines a target total memory size for storing a target maximum number of decoded pictures in the DPB at a target resolution in a target colour format in step 310. Also, the method determines a scaling factor for current pictures having the same target resolution, but in a second colour format different from the target colour format in step 320. A second maximum number of second decoded pictures is allocated in the DPB for the current pictures according to the target maximum number of decoded pictures scaled by the scaling factor in step 330, where the scaling factor is smaller than 1 for at least one second colour format. The current picture is encoded or decoded using decoded pictures stored in the DPB as reference data, wherein a total number of decoded pictures in the DPB is equal to or less than the maximum allowed number of decoded pictures in the DPB in step 330.

Figure 4:
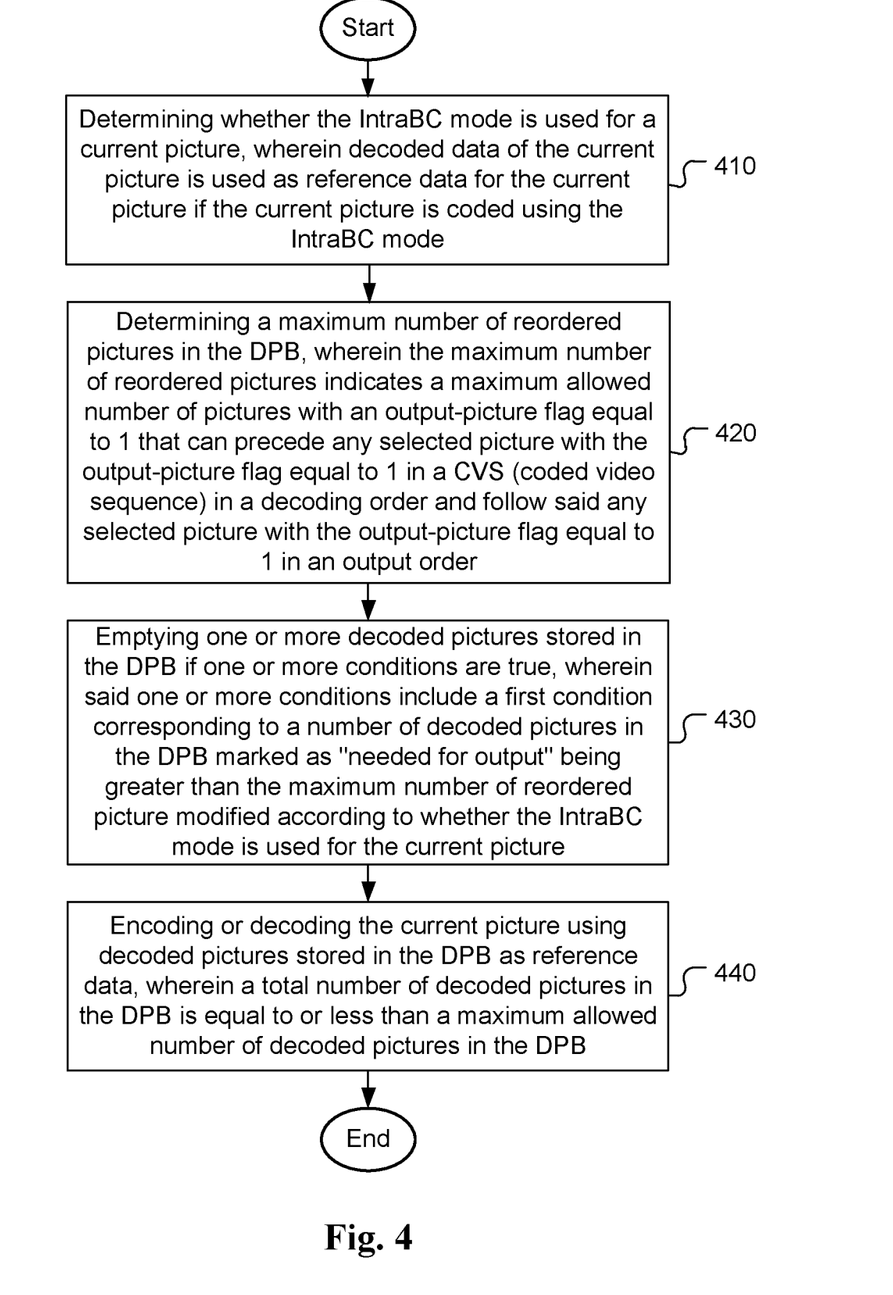
FIG. 4 illustrates a flowchart of an exemplary coding system using coding modes including IntraBC mode (Intra-block copy mode) and Inter prediction mode according to an embodiment of the present invention, where one or more decoded pictures stored in the DPB are emptied if certain conditions are true, where the conditions include a condition corresponding to a number of decoded pictures in the DPB marked as "needed for output" being greater than the maximum number of reordered picture modified according to whether the IntraBC mode is used for the current picture.

FIG. 4 illustrates a flowchart of an exemplary coding system using coding modes including IntraBC mode (Intra-block copy mode) and Inter prediction mode according to an embodiment of the present invention, where one or more decoded pictures stored in the DPB are emptied if certain conditions are true, where the conditions include a condition corresponding to a number of decoded pictures in the DPB marked as "needed for output" being greater than the maximum number of reordered picture modified according to whether the IntraBC mode is used for the current picture. The method determines whether the IntraBC mode is used for a current picture in step 410, where decoded data of the current picture is used as reference data for the current picture if the current picture is coded using the IntraBC mode. A maximum number of reordered pictures in the DPB is determined in step 420, where the maximum number of reordered pictures indicates a maximum allowed number of pictures with an output-picture flag equal to 1 that can precede any selected picture with the output-picture flag equal to 1 in a CVS (coded video sequence) in a decoding order and follow said any selected picture with the output-picture flag equal to 1 in an output order. One or more decoded pictures stored in the DPB are emptied if one or more conditions are true in step 430, where said one or more conditions include a first condition corresponding to a number of decoded pictures in the DPB marked as "needed for output" being greater than the maximum number of reordered picture modified according to whether the IntraBC mode is used for the current picture. The current picture is encoded or decoded using decoded pictures stored in the DPB as reference data, wherein a total number of decoded pictures in the DPB is equal to or less than the maximum allowed number of decoded pictures in the DPB in step 440.

The flowcharts shown are intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of managing a DPB (decoded picture buffer) for a video coding system, wherein the video coding system uses coding modes including an Inter prediction mode and an IntraBC (Intra Block Copy) mode, comprising:
   determining whether the IntraBC mode is used for a current picture, wherein decoded data of the current picture is used as reference data for the current picture if the current picture is coded using the IntraBC mode;
   allocating, in the DPB, a memory space having a first size for storing at most a first maximum allowed number of decoded pictures in response to the IntraBC mode being determined to be used for the current picture;
   allocating, in the DPB, the memory space having a second size for storing at most a second maximum allowed number of decoded pictures in response to the IntraBC mode being determined not to be used for the current picture, the second maximum allowed number being less than the first maximum allowed number; and
   encoding or decoding the current picture using decoded pictures stored in the allocated memory space in the DPB as reference data.

2. The method of claim 1, wherein whether the IntraBC mode is used for the current picture is indicated by a syntax flag or a variable, and a value of the syntax flag or the variable is related to whether two versions of decoded current picture need to be stored.

3. The method of claim 2, further comprising emptying one or more decoded pictures stored in the allocated memory space in the DPB when one or more conditions are true, wherein the one or more conditions include a condition corresponding to a total number of decoded pictures in the allocated memory space in the DPB that is marked as needed for output being greater than or equal to a first maximum number of reordered pictures, when the syntax flag or the variable indicates that two versions of decoded current picture are not need to be stored, and a second maximum number of reordered pictures that is modified according to the first maximum number of reordered pictures, when the syntax flag or the variable indicates that two versions of decoded current picture are need to be stored.

4. The method of claim 3, wherein a syntax element indicating the first maximum number of reordered pictures is signaled in a Sequence Parameter Set (SPS).

5. The method of claim 3, wherein the second maximum number of reordered pictures is less than the first maximum number of reordered pictures.

6. The method of claim 3, wherein the second maximum number of reordered pictures corresponds to reducing the first maximum number of reordered pictures by the value of the syntax flag or the variable.

7. The method of claim 1, wherein a syntax element indicating the first maximum allowed number of decoded pictures is signaled in a Sequence Parameter Set (SPS).

8. An apparatus for managing a DPB (decoded picture buffer) in a video coding system, wherein the video coding system uses coding modes including an Inter prediction mode and an IntraBC (Intra Block Copy) mode, the apparatus comprising:
   one or more electronic circuits or processors configured to:
      determine whether the IntraBC mode is used for a current picture, wherein decoded data of the current picture is used as reference data for the current picture if the current picture is coded using the IntraBC mode;
      allocate, in the DPB, a memory space having a first size for storing at most a first maximum allowed number of decoded pictures in response to the IntraBC mode being determined to be used for the current picture;
      allocate, in the DPB, the memory space having a second size for storing at most a second maximum allowed number of decoded pictures in response to the IntraBC mode being determined not to be used for the current picture, the second maximum allowed number being less than the first maximum allowed number; and
      encode or decode the current picture using decoded pictures stored in the allocated memory space in the DPB as reference data.

* * * * *